UNITED STATES PATENT OFFICE.

ALBERT L. CLAPP, OF MARBLEHEAD, MASSACHUSETTS.

WATERPROOF PAPER AND PROCESS OF PRODUCING THE SAME.

1,345,476.

Specification of Letters Patent.

Patented July 6, 1920.

No Drawing.

Application filed July 11, 1918. Serial No. 244,477.

*To all whom it may concern:*

Be it known that I, ALBERT L. CLAPP, a citizen of the United States, residing at Marblehead, in the county of Essex and State of Massachusetts, have invented new and useful Improvements in Waterproof Paper and Processes of Producing the Same, of which the following is a specification.

This invention relates to the production of waterproof paper in which the waterproofing compound is added to the stock in the beater.

Heretofore it has been proposed to render paper waterproof by the precipitation of aluminum soap during the beating operation so as to secure an approximately homogeneous mass, but this has its technological disadvantages, because the resultant pulp is sticky and adhesive, and consequently the web-forming machinery soon becomes gummed and rendered incapable of use. That is to say, the cylinders, the wires and the felts soon become plugged with the aluminum compound which is especially sticky when it is wet.

I have discovered that it is possible to produce a waterproof paper by the precipitation of a calcium soap, such as calcium oleate, in the beater stock, and that indeed this may be accomplished together with the usual precipitation of aluminum resinate in the ordinary operation of rosin-sizing paper, without adhesiveness or tackiness in the mass of wet pulp. In fact, better results are secured by the precipitation of both the calcium soap and the aluminum resinate in the stock than are accomplished by either process carried on separately. This is doubtless due to the fact that a part of the calcium oleate tends to precipitate in a more or less granular mass and to float out and not adhere to the fibers. On the other hand, if the rosin-sizing is carried on alone, such an enormous proportion of the aluminum resinate must be present to render the paper waterproof, that the resulting paper is too hard and harsh. Where both the calcium oleate and aluminum resinate are precipitated in the same stock in the beater, the aluminum resinate assists in fixing the oleate upon the fibers because of its greater retention of water and its natural adhesiveness, without making the wet pulp gummy or sticky; and, since the sodium oleate is soft, the resulting paper is soft and pliable as well as waterproof. For some purposes, it is desirable also to precipitate silica in the beater stock to give a "crackly" paper, and this may be accomplished by the use of sodium silicate. The precipitant for both the aluminum resinate and the silica is preferably alum (aluminum sulfate) which is added in sufficient excess to bring about both reactions and effectively to neutralize any alkali remaining as the result of the chemical reactions. In the other cases, however, I may omit both the aluminum resinate and the silica.

As an example of one method of carrying out my process, I proceed as follows: I first produce a sufficient quantity of soap, preferably sodium oleate, of which a thin aqueous solution is prepared. In making the soap, to a sufficient quantity of water, is added 5 pounds of caustic soda, and the solution is heated to about 180° F. Then 10 pounds of red oil or elaine is added, the heating continued, and the mass stirred until saponification occurs. The beater engine is charged with 1,000 pounds of sulfate pulp, commonly used in the manufacture of kraft paper, although, if desired, other paper stock may be used, where the strength of the paper is not an especial consideration. I then add 15 pounds of ordinary slaked lime (calcium hydroxid), and, after sufficient water is added to secure the proper circulation of the stock, the beater is started and continued in operation until the contents are thoroughly mixed. I now pour in the soap solution in sufficient quantity to add 15 pounds of soap to the mass already in the beater.

During the beating operation, which is continued after the addition of the soap, a reaction occurs between the calcium hydroxid and the sodium oleate, with the precipitation of finely divided calcium oleate upon and its thorough admixture with the fibers. This takes place in the course of approximately 15 minutes, and then I add about 25 pounds of sodium silicate, and 6 gallons of rosin-size (sodium resinate), more or less, to the mass. After these have been thoroughly mixed into the mass I then introduce 75 to 100 pounds of alum (aluminum sulfate), with the consequent precipitation of silica and aluminum resinate. The quantity of alum is in excess of that needed for the precipitation of the silica and the aluminum resinate, in order to neutralize any free caustic or any free calcium hydroxid that may result from the various reactions. The mass, in which the calcium oleate, aluminum resinate and silica have been precipitated upon the fibers and evenly distributed throughout the mass, is now formed into sheets by any suitable web-forming mechanism such as a Fourdrinier or a wet machine, and then dried in any suitable manner.

With stock prepared as herein described, it is possible to operate the paper-forming mechanism with as great ease and facility as in the regular process of rosin-sizing.

Of course it will be understood that I do not limit myself to the proportions of the ingredients which I have herein described, nor to the precipitation of silica in the mass, although I regard the presence of the silica as desirable for some technological purposes. One of the advantages incident to the process which I have herein described, in which sodium oleate is used as one of the raw materials, is the possibility of carrying on the beating while the stock is at ordinary temperatures. I may, however, substitute therefor a stearate or palmitate, or alkaline salt of the other fatty acids, in which case the stock must be heated in order to form the corresponding calcium soap. While this has its disadvantages, because of the necessity of heating the stock, it sometimes has the advantage of being cheaper, even with the cost of heating added, because of the relatively low price of the other forms of the fatty acids. Of course, in saponifying the fatty acids, I may employ the hydroxid of any of the alkaline earth metals.

What I claim is:

1. A process of producing waterproof paper, which comprises mixing a soluble soap with fibrous paper stock and precipitating calcium soap therefrom in and throughout the stock, by the addition of calcium hydroxid to said stock, and then precipitating aluminum resinate in said stock.

2. A process of producing waterproof paper, which comprises first mixing a soluble soap with fibrous paper stock and precipitating calcium soap therefrom in and throughout the stock by the addition of calcium hydroxid, and than fixing said precipitate upon the fibers by the precipitation of aluminum resinate throughout the mass in the presence of said precipitate.

3. A step in the process of producing waterproof paper, which comprises mixing a soluble soap with fibrous paper stock, precipitating calcium soap therefrom in and throughout the stock by calcium hydroxid and forming the mass into a sheet.

4. A step in the process of producing waterproof paper, which consists in mixing calcium hydroxid with fibrous paper stock, and mixing a soluble soap therewith and precipitating calcium soap throughout the mass of stock.

5. A process of producing waterproof paper, which comprises mixing calcium hydroxid with fibrous paper stock, mixing a soluble soap therewith and precipitating calcium soap throughout the mass of stock, then mixing sodium resinate with said mass, and adding and mixing alum into the mass and thereby precipitating aluminum resinate therein.

6. A process of producing waterproof paper, which comprises first precipitating calcium soap throughout a mass of paper stock then mixing sodium resinate and sodium silicate with the mass, and finally simultaneously precipitating aluminum resinate and silica throughout the mass by the addition of alum.

7. A process of producing waterproof paper, which comprises first precipitating calcium soap throughout a mass of paper stock, then mixing sodium resinate and sodium silicate with the mass and finally adding alum in excess to precipitate aluminum resinate and silica, and to neutralize free alkali and calcium compounds.

8. A waterproof paper consisting of paper stock impregnated with a waterproofing material comprising finely divided calcium soap and an aluminum resinate binder fixing such soap on the fibers.

9. A waterproof paper, non-sticky when wet, consisting of paper stock impregnated with a waterproofing material comprising finely divided calcium soap and a non-sticky binder.

10. A waterproof paper consisting of paper stock impregnated with a waterproofing material comprising finely divided calcium soap fixed upon the fibers by aluminum resinate.

11. A waterproof paper, which is non-sticky when wet, consisting of fiber impregnated with calcium coap, aluminum resinate and silica all finely divided by precipitation.

In testimony whereof I have affixed my signature.

ALBERT L. CLAPP.